United States Patent
Kim et al.

(10) Patent No.: US 9,069,198 B2
(45) Date of Patent: Jun. 30, 2015

(54) DISPLAY APPARATUS

(75) Inventors: DongYong Kim, Samcheok-si (KR); JaeWoo Park, Gumi-si (KR); NamDo Son, Chilgok-gun (KR); SungWoo Kim, Daegu (KR); JongSub Park, Chilgok-gun (KR); KyungMi Kim, Chilgok-gun (KR); KeyYoung Yang, Chilgok-gun (KR); GiNam Jean, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 570 days.

(21) Appl. No.: 13/337,952

(22) Filed: Dec. 27, 2011

(65) Prior Publication Data

US 2012/0206669 A1 Aug. 16, 2012

(30) Foreign Application Priority Data

Feb. 14, 2011 (KR) .................. 10-2011-0012994
Mar. 17, 2011 (KR) .................. 10-2011-0023969

(51) Int. Cl.
*G02F 1/1333* (2006.01)
*G02F 1/1335* (2006.01)
*G02F 1/1341* (2006.01)

(52) U.S. Cl.
CPC .... *G02F 1/133308* (2013.01); *G02F 1/133615* (2013.01); *G02F 1/1341* (2013.01); *G02F 2001/133314* (2013.01); *G02F 2001/133388* (2013.01)

(58) Field of Classification Search
USPC .................................................. 349/58, 149
See application file for complete search history.

(56) References Cited

U.S. PATENT DOCUMENTS

| 2003/0122978 A1* | 7/2003 | Lim ................. 349/42 |
| 2004/0212555 A1 | 10/2004 | Falco |
| 2007/0153119 A1 | 7/2007 | Bilbrey |
| 2010/0315570 A1* | 12/2010 | Mathew et al. ......... 349/58 |
| 2012/0106063 A1 | 5/2012 | Mathew et al. |

FOREIGN PATENT DOCUMENTS

| CN | 1996202 A | 7/2007 |
| JP | 2004200944 A | 7/2004 |
| JP | 2006352427 A | 12/2006 |
| JP | 2009053261 A | 3/2009 |
| JP | 2009223219 A | 10/2009 |
| JP | 2012137738 A | 7/2012 |

* cited by examiner

*Primary Examiner* — Lucy Chien
(74) *Attorney, Agent, or Firm* — Brinks Gilson & Lione

(57) ABSTRACT

Disclosed is a display apparatus in which liquid crystal is injected into a non-display area having a transmitting hole formed in a predetermined portion of a panel corresponding to a camera, wherein the display apparatus comprises a display unit having a panel; and a guide frame, wherein the guide frame includes: a guide sidewall; and a panel supporter, wherein a camera receiving part with a camera mounted thereon is formed in a first panel support of the panel supporter, a transmitting hole for transmitting light to the camera is formed in a black matrix of a first non-display area to be placed on the first panel supporter of the upper substrate, and a display area of the panel and the first non-display area are filled with liquid crystal.

29 Claims, 10 Drawing Sheets

DISPLAY APPARATUS

This application claims the priority and the benefit under 35 U.S.C. §119(a) on Patent Application No. 10-2011-0012994 filed in Republic of Korea on Feb. 14, 2011 and Patent Application No. 10-2011-0023969 filed in Republic of Korea on Mar. 17, 2011, the entire contents of which are hereby incorporated by reference.

BACKGROUND

1. Field of the Invention

The present disclosure relates to a display apparatus, and more particularly, to a borderless type display apparatus with a built-in camera.

2. Discussion of the Related Art

Recently, various flat-type display devices, which substitute for Cathode Ray Tube (CRT), have been actively researched and studied. For example, Liquid Crystal Display (LCD) device, Plasma Display Panel (PDP), Field Emission Display Device (FED), Light Emitting Display (LED) device, and etc. Especially, the LCD device has attracted great attentions owing to the advantageous properties such as mass production technology, simple driving means, and high picture quality.

Recent research and development are particularly being required on designs of products appealing to consumers. Consequently, efforts for minimizing the thicknesses (slimness) of LCD devices are continuously being made, and research is being conducted on a design with enhanced sense of beauty that can induce consumers to buy by appealing to consumers' sense of beauty.

In efforts for minimizing the thicknesses of LCD devices and design development for enhancing a sense of beauty that have been made to date, however, the existing elements have been applied as is, the structures of the elements have been changed simply, and thus, there are limitations in minimizing the thicknesses of the LCD devices and developing new designs of the LCD devices.

For example, a related art LCD device necessarily uses lower and upper cases to receive a liquid crystal display panel and a backlight unit therein. In addition, front and rear set covers are additionally used in the related art LCD device to manufacture a product such as a notebook computer, a monitor, a mobile device, or a television.

As the lower and upper cases and the front and rear set covers for the manufactured device are inevitably used, it makes a limitation in the slimness of the display device and the advance toward the new design. Especially, the front edge parts of the liquid crystal display panel are covered with the upper case and the front set cover, whereby the liquid crystal display device is increased in its thickness. Also, the border width of the liquid crystal display device may be increased so that the difference in height of the stepped portion may cause limitations in advance toward the innovative design.

Recently, a notebook computer having a camera has been introduced for a video chatting or video conference. Thus, since an additional space for the camera is necessarily required in the notebook computer, a border width of a screen in the notebook computer is increased more, whereby it makes a limitation in the advance toward the new design.

In order to overcome this problem, various display apparatuses without the stepped portion on the plane has been researched and studied.

In case of the display apparatus having a camera mounted on a lower side of a panel, a transmitting hole is formed under the circumstance that black matrix patterns deposited on an upper substrate of the panel are removed from a portion corresponding to the camera, whereby ambient light comes into the camera without being affected by the black matrix.

However, in case of the above display apparatus according to the related art, there is an empty space between the lower substrate and the black matrix in the periphery of the transmitting hole. If the upper substrate is pushed by an external force, a depression may occur in the periphery of the transmitting hole, whereby mura defect may occur in a display area adjacent to the transmitting hole.

As mentioned above, since the display apparatus according to the related art has the empty space between the lower substrate and the black matrix in the periphery of the transmitting hole, a concentric-circle shaped diffraction pattern is generated on an image taken by the camera due to a diffraction of light passing through the glass upper substrate and the transmitting hole.

BRIEF SUMMARY

A display apparatus comprises: a display unit having a panel which is provided with lower and upper substrates sealed under the circumstance that liquid crystal is filled therebetween; and a guide frame which supports the display unit, wherein the guide frame includes: a guide sidewall which guides a lateral side of the panel; and a panel supporter which supports the panel, wherein a camera receiving part with a camera mounted thereon is formed in a first panel supporter of the panel supporter, a transmitting hole for transmitting light to the camera is disposed in a black matrix of a first non-display area to be placed on the first panel supporter of the upper substrate, and a display area of the panel and the first non-display area are filled with liquid crystal.

In another aspect of the present invention, there is provided a display apparatus comprising: a display unit having a panel which is provided with lower and upper substrates sealed under the circumstance that liquid crystal is filled therebetween; and a guide frame which supports the display unit, wherein the guide frame includes: a guide sidewall which guides a lateral side of the panel; and a panel supporter which supports the panel, wherein a camera receiving part with a camera mounted thereon is formed in a first panel supporter of the panel supporter, a transmitting hole for transmitting light to the camera is formed in a black matrix of a first non-display area to be placed on the first panel supporter of the upper substrate, a first seal is formed between a display area of the panel and the first non-display area, and liquid crystal is filled only in the display area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display apparatus according to the present invention will be described with reference to the accompanying drawings.

Figure 1:
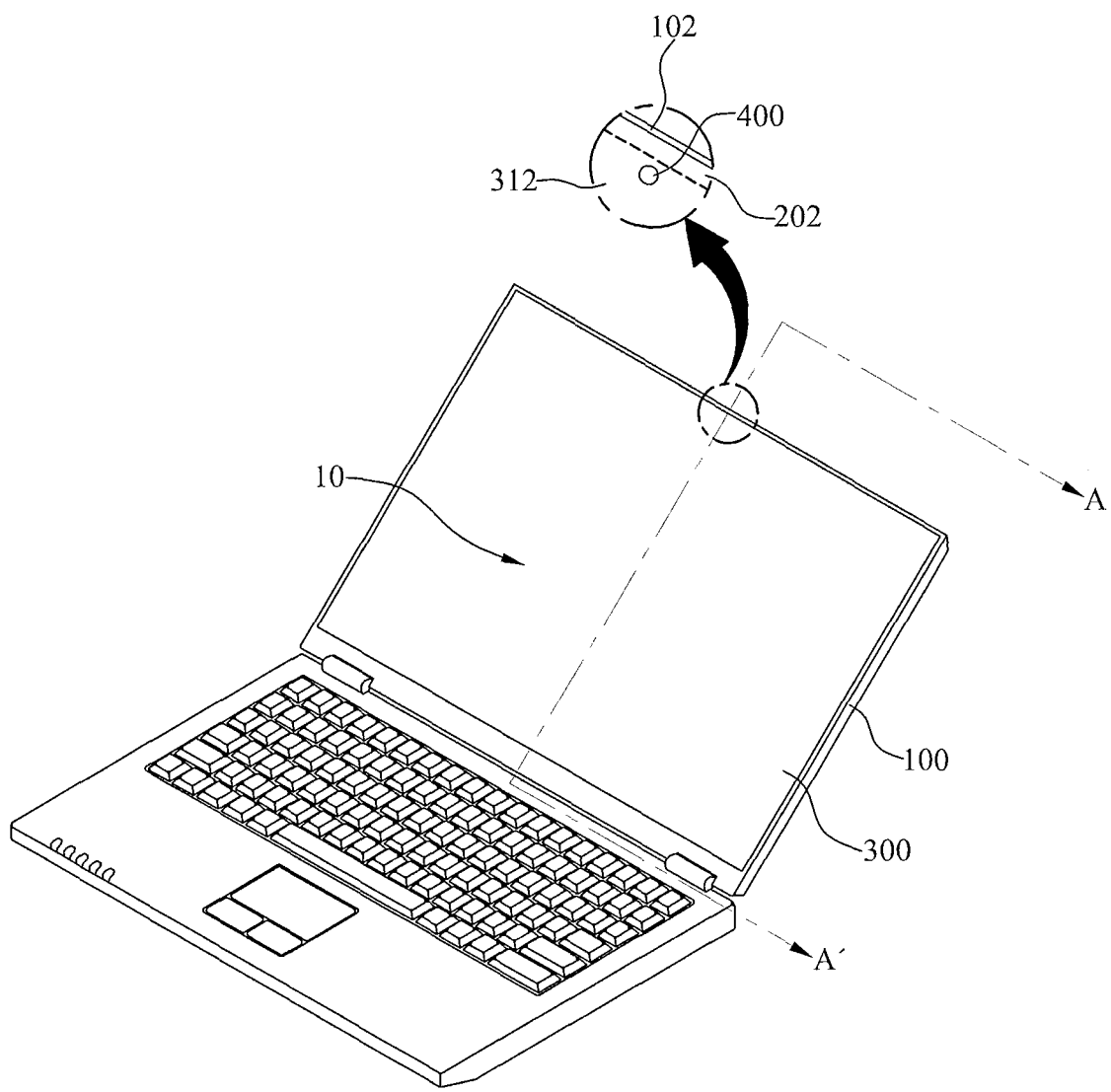
FIG. 1 illustrates a notebook computer with a display apparatus according to the present invention.

FIG. 1 illustrates a notebook computer with a display apparatus according to the present invention.

The display apparatus 10 according to the present invention may be applied to a small-sized terminal such as a notebook computer. Especially, the display apparatus 10 according to the present invention is characterized in that it includes a camera 400 which is formed in a lower side of a panel, wherein the camera 400 collects user's images.

The display apparatus 10 according to the present invention is characterized in that a plane for forming the exterior is formed without stepped portions so as to realize a borderless type display apparatus.

As shown in FIG. 1, the above display apparatus 10 according to the present invention may function as a monitor of a small-sized notebook computer. This monitor is formed in such a manner that a set cover 100 covers the display apparatus 10. Also, there is no stepped portion between the set cover 100 and the plane of the display apparatus 10.

As mentioned above, the display apparatus 10 according to the present invention may be formed without the stepped portion on the plane, or may be formed by covering the peripheral portion of the plane with the set cover in type of narrow bezel.

This is to guide the ambient light toward a camera lens through a transmitting hole in a non-display area of a panel. The display apparatus may be formed by covering a predetermined portion of the non-display area of the panel with an end of set cover or guide frame without providing a stepped portion on the plane of the panel, or may be formed by covering a predetermined portion of the non-display area of the panel with an end of set cover or guide frame with a stepped portion on the plane of the panel.

Hereinafter, there is an explanation for the display apparatus formed by covering the predetermined portion of the non-display area of the panel with the end of set cover or guide frame without providing the stepped portion on the plane of the panel. However, the present invention may be applied to the display apparatus formed by covering the predetermined portion of the non-display area of the panel with the end of set cover or guide frame with the stepped portion on the plane of the panel.

Figure 2:
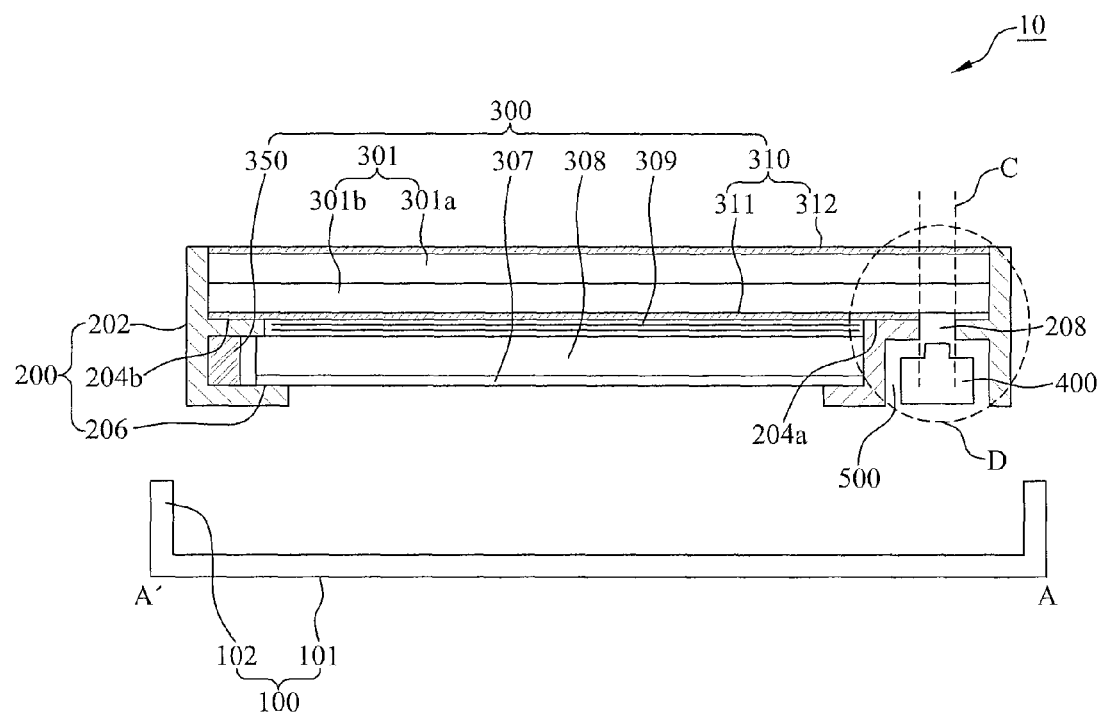
FIG. 2 is a cross section view illustrating a display apparatus according to the present invention.

FIG. 2 is a cross section view illustrating a display apparatus according to the present invention, which is a cross section view along A-A' of FIG. 1.

The display apparatus 10 according to the present invention forms a monitor for outputting images, wherein the monitor is mounted on a small-sized terminal. As shown in FIG. 2, the display apparatus 10 according to the present invention includes a guide frame 200 and a display unit 300, and the display apparatus 10 according to the present invention is mounted on and fixed into a set cover 100. Also, a camera 400 is provided between the set cover 100 and the guide frame 200, or between the guide frame 100 and a panel 301 of the display unit 300. That is, the display apparatus 10 according to the present invention may form a monitor of a small-sized terminal covered with the set cover 100. Meanwhile, the display apparatus 10 according to the present invention may include the set cover 100. Hereinafter, the display apparatus 10 without the set cover 100 will be explained as follows. That is, the set cover 100 covers the exterior of the display apparatus 10. Substantially, the set cover 100 forms the exterior of a terminal such as a monitor of a notebook computer.

First, the set cover 100 is formed in a square-shaped frame, wherein the set cover 100 supports the guide frame 200, and covers a lateral side of the guide frame 200. Thus, the set cover 100 covers the display apparatus 10.

At this time, the set cover 100 may be formed of a plasmatic material or metal material, wherein the set cover 100 includes a set plate 101 and a set sidewall 102.

The set plate 101, which is formed in a plate type, serves as a lower cover of the manufactured display apparatus.

The set sidewall 102 is vertically bent from the set plate 101, thereby forming a receiving space. The set sidewall 102 is formed to cover the lateral side of the guide frame 200 to be explained, whereby the set sidewall 102 serves as a lateral cover of the display apparatus.

As shown in FIG. 2, there is no difference in height between an end of the set sidewall 102 and an upper surface of the panel 301. As mentioned above, the end of the set sidewall may be bent toward the inside of the panel of the display apparatus, whereby there may be difference in height.

Then, the guide frame 200 for supporting the display unit 300 is received in the space prepared by the set cover 100. The guide frame 200 includes a guide sidewall 202, a panel supporter 204, and a lower supporter 206. Especially, a camera hole 208 for receiving a camera therein is formed in the panel supporter.

The guide sidewall 202 is formed in parallel with the set sidewall 102 of the set cover 100. The guide sidewall 202, which is formed in a square-shaped frame, covers the lateral side of the display unit 300. At this time, an upper surface of the guide sidewall 202 covers the lateral side of the display unit 300 while being exposed to the external and being not overlapped with an upper edge of the display unit 300, whereby the upper surface of the guide sidewall 202 forms the border of the display unit 300.

The panel supporter 204 protrudes from the guide sidewall 202 in the opposite direction to the set sidewall 102, whereby the panel supporter 204 supports the panel 301 of the display unit 300. That is, the panel supporter 204 is formed in each of four sides of the guide sidewall 202 of the square-shaped frame, thereby supporting the panel.

The panel supporter 204 includes a first panel supporter 204a, a second panel supporter 204b, a third panel supporter, and a fourth panel supporter.

As shown in FIG. 2, the above camera is arranged in the first panel supporter 204a; and the second panel supporter 204b is arranged in the opposite side to the first panel supporter 204a. That is, the first and second supporters 204a and 204b are formed at the opposite sidewalls among the four sidewalls of the guide sidewall 202 of the square-shaped frame. Also, the third panel supporter (not shown) and the fourth panel supporter (not shown) are formed at the other two sidewalls of the guide sidewall of the square-shaped frame.

Especially, the camera hole 208 is formed in the first panel supporter 204a in which the camera 400 is to be arranged, whereby the lens of the camera 400 is exposed to the external via the panel 301.

In FIG. 2, the camera is arranged below the first panel supporter 204a. However, the camera may be arranged between the first panel supporter and the panel. In this case, the first panel supporter may be formed in the '∪' shape. In case of FIG. 2, since the first panel supporter is formed in the '∩' shape, the camera is placed below the first panel supporter, and the camera hole is formed in the first panel supporter. Meanwhile, if the first panel supporter is formed in the '∪' shape, the camera is arranged between the first panel supporter and the panel, and the camera hole is not additionally formed in the first panel supporter.

A room for the camera, which may be formed below or above the first panel supporter, is referred to as a camera receiving part 500. That is, as shown in FIG. 2, the camera receiving part 500 may be provided between the first panel supporter and the set plate 101, or may be provided between the first panel supporter and the panel 301.

That is, the first panel supporter 204a supports the panel 301. Also, the first panel supporter 204a protruding from the guide sidewall 202 may be formed in various shapes for receiving the camera 400 therein.

The lower supporter 206 protrudes from the lower end of the panel supporter or the lower end of the guide sidewall in the opposite direction to the set sidewall 102, wherein the lower supporter 206 is provided below the panel supporter 204. The lower supporter 206 supports a reflective plate 307, a light-guiding plate 308, an optical film 309, and a light source 350.

That is, the lower supporter 206 is provided below the panel supporter 204, and the lower supporter 206 supports the above reflective plate 307, the light-guiding plate 308, the optical film 309, and the light source 350. If the lower supporter 206 protrudes from the first panel supporter 204a for receiving the camera 400, as shown in FIG. 2, the lower supporter 206 protrudes from the lower end of the first panel supporter in the opposite direction to the set sidewall. In addition, the lower supporter 206 may protrude from the guide sidewall 202 in the lower side of the panel supporter 204 while being in the opposite direction to the set sidewall 102.

Although not shown, the first panel supporter 204a may have additional rooms at both sides of the camera receiving part 500, wherein the additional rooms are similar in shape to the camera receiving part. In this case, antenna or antenna wire may be arranged in these additional rooms of the first panel supporter.

The display unit 300 may include the panel 301; polarizing plates 311, 312, 310; the optical film 309, the light-guiding plate 308, the reflective plate 307, and the light source 350.

The panel 301 is formed by bonding an upper substrate 301a and a lower substrate 301b to each other. The panel 301 includes a display area in which various devices are formed; and a non-display area which is formed in the periphery of the display area. At this time, the non-display area is divided into a first non-display area, a second non-display area, a third non-display area, and a fourth non-display area. The first panel supporter 204a is placed on the first non-display area; the second panel supporter 204b is placed on the second non-display area; the third panel supporter is placed on the third non-display area; and the fourth panel supporter is placed on the fourth non-display area.

According as liquid crystal injected between the upper and lower substrates 301a and 301b is driven by a voltage applied to the lower substrate, the panel 301 outputs an image in accordance with a transmission amount of light emitted from the light source 350, wherein the panel 301 may be formed in various types.

The light source 350 is provided to supply the light to the panel. In this case, various kinds of light source may be used. Recently, a light-emitting diode (LED) is used for the light source 350.

Figure 3:
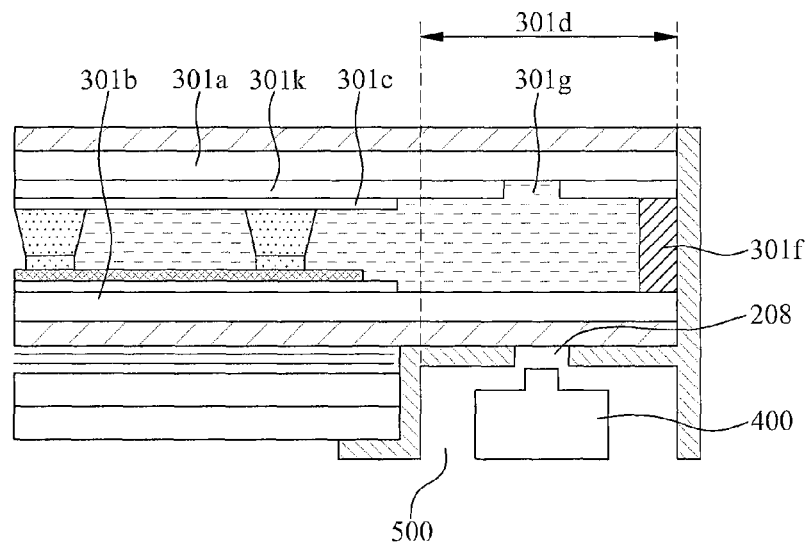
FIG. 3 is a detailed cross section view illustrating a display apparatus according to the first embodiment of the present invention.

The light-guiding plate 308 diffuses and reflects the light emitted from the light source 350 toward the panel. That is, as shown in FIGS. 2 and 3, the light-guiding plate 308 is provided in a side-light type display apparatus in which the light source 350 is formed at a lateral side thereof, wherein the light-guiding plate 308 guides the light emitted from the light source toward the panel.

The optical film 309 diffuses the light passing through the light-guiding plate 308, or enables the vertical incidence of the light passing through the light-guiding plate 308 on the panel 301. The optical film 309 may include a diffusion sheet, a prism sheet, and etc., wherein the optical film 309 may vary in structure.

The reflective sheet 307 is provided on a lower surface of the light-guiding plate, wherein the reflective sheet 307 reflects the light emitted from the light source toward the panel. That is, the light, which is emitted from the light source and is then incident on the light-guiding plate, is refracted by a pattern on the light-guiding plate, and is reflected toward the panel. However, there may be the light discharged to the external through the lower surface of the light-guiding plate without being reflected. In this case, the reflective sheet re-reflects the light toward the panel.

The polarizing film 311, 312, 310 is attached to the plane or lower surface of the panel including the liquid crystal. The polarizing film 311, 312, 310 transmits predetermined ingredients of light according as the voltage applied to the panel is turned-on/off.

Meanwhile, the present invention is characterized by the display unit 300, especially, the structure of the panel 301. The detailed structure of the display apparatus according to the present invention will be described with reference to FIGS. 3 to 16.

FIG. 3 is a detailed cross section view illustrating the display apparatus according to the first embodiment of the present invention, which illustrates the detail of portion 'D' of FIG. 2.

That is, FIG. 3 is a detailed cross section view illustrating the display apparatus according to the first embodiment of the present invention, especially, the detailed cross section view of the panel.

First, the panel includes the upper substrate 301a, the lower substrate 301b, and the liquid crystal layer between the upper substrate 301a and the lower substrate 301b.

The lower substrate is a driving device array substrate. Although not shown in detail, there are plural pixels on the lower substrate, wherein each pixel includes a driving device such as a thin film transistor.

The upper substrate is a color filter substrate, wherein a color filter layer for realizing color is formed on the upper substrate.

On each of the lower substrate 301b and the upper substrate 301a, there are pixel electrodes, common electrodes, and an alignment layer coated for alignment of liquid crystal molecules included in the liquid crystal layer.

The lower substrate and the upper substrate are bonded to each other by the use of sealant formed in the periphery of the substrate. Between the lower substrate 301b and the upper substrate 301a, there is a space for maintaining a cell gap therebetween.

In the panel 301 having the above structure, the liquid crystal molecules are driven by the driving device on the lower substrate, whereby information is displayed by controlling the amount of light passing through the liquid crystal layer.

In the above structure of the panel, the lower substrate is formed by a driving device array substrate process, and the upper substrate is formed by a color filter substrate process for forming the color filter.

The driving device array substrate process includes steps of forming a plurality of gate lines and data lines to define pixel regions on the lower substrate; forming the thin film transistor corresponding to the driving device, which is connected with the gate and data lines, in each pixel region; and forming the pixel electrode connected with the thin film transistor, wherein the pixel electrode drives the liquid crystal layer in accordance with a signal applied via the thin film transistor.

The color filter substrate process includes steps of forming a black matrix on the upper substrate; forming the color filter thereon; and forming the common electrode.

On the upper substrate of the panel applied to the display apparatus according to the first embodiment of the present invention, the black matrix 301k is coated thereon, and the black matrix 301k is formed in the first non-display area of the panel. Also, a transmitting hole 301g is formed at a position corresponding to the camera in the black matrix of the first non-display area. The transmitting hole 301g may be formed by an etching process of the color filter substrate process. That is, the black matrix 301k, the color filter (not shown), and the common electrode 301c are deposited on the upper substrate 301a, and then the transmitting hole 301g is formed by the etching process using a mask. In this case, the transmitting hole 301g is formed when the black matrix 301k is etched together with the color filter (not shown) or the common electrode.

On the common electrode or a planarization layer of the upper substrate, there is the spacer for maintaining the cell gap between the upper substrate 301a and the lower substrate 301b. Preferably, the spacer is formed of a column spacer. The column spacers may be provided on desired portions of the entire surface of the panel at the constant density. That is, since the column spacers are provided on the desired portions, the cell gap is constantly maintained between the lower substrate 301b and the upper substrate 301a, thereby preventing an aperture ratio from being deteriorated.

On the lower substrate 301b, there may be a protrusion corresponding to the column spacer. This protrusion prevents a press defect when the column spacer contacts with the substrate.

As mentioned above, the column spacer deposited on the upper substrate may directly contact with the lower substrate so as to maintain the cell gap between the lower substrate and the upper substrate, or may contact with the protrusion so as to maintain the cell gap between the lower substrate and the upper substrate.

That is, the panel 301 is formed by bonding the upper substrate 301a having the column spacer deposited thereon with the lower substrate 301b.

Thereafter, the edge of the panel 301 is sealed by a seal 301f, and then the liquid crystal is injected into the inside of the panel 301 via an inlet under the circumstance that the edge of the panel 301 is sealed. Then, the panel 301 is completed by sealing the inlet.

As shown in FIG. 3, the present invention is characterized in that the liquid crystal is formed in the first non-display area.

That is, since the liquid crystal is injected into the liquid crystal layer of the first non-display area 301d, it is possible to prevent a depression in the periphery of the transmitting hole 301g of the first non-display area.

Moreover, a refractive index of the liquid crystal is closer to that of a glass than a refractive index of air or a refractive index of vacuum. Therefore, when the liquid crystal is injected into the liquid crystal layer in the first non-display area 301d, diffraction can be prevented from occurring around the transmitting hole. Accordingly, a diffraction pattern can be prevented from being formed on an image that is captured by the camera.

Figure 4:
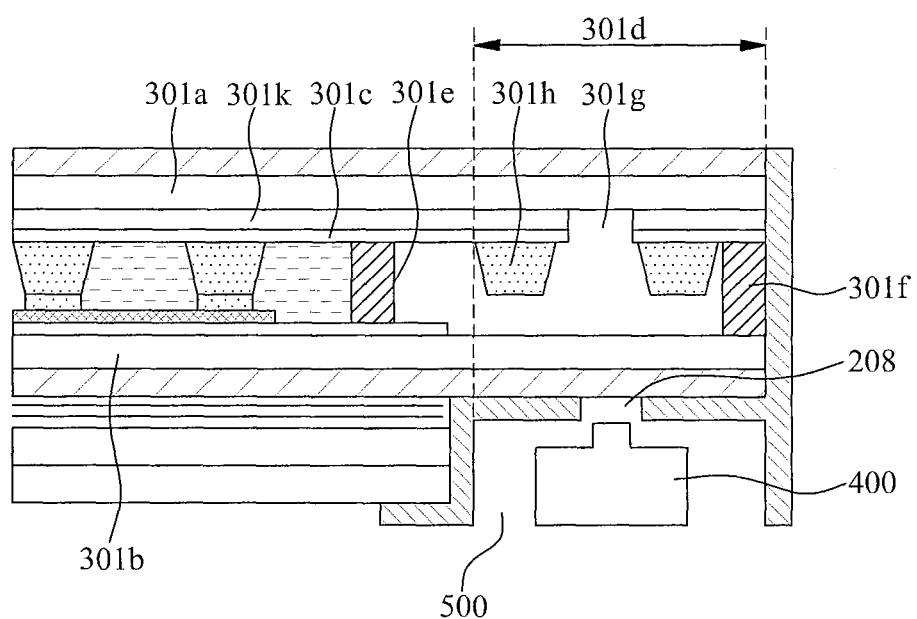
FIG. 4 is a detailed cross section view illustrating a display apparatus according to the second embodiment of the present invention.

FIG. 4 is a detailed cross section view illustrating a display apparatus according to the second embodiment of the present invention, which illustrates the detail of portion 'D' of FIG. 2.

Except the inner structure of the panel, the display apparatus according to the second embodiment of the present invention is identical in structure to the display apparatus according to the first embodiment of the present invention, whereby a detailed explanation for the same parts will be omitted or will be described in brief.

That is, FIG. 4 is a detailed cross section view illustrating the display apparatus according to the second embodiment of the present invention, especially, the detailed cross section view of the panel.

First, the panel includes the upper substrate 301a, the lower substrate 301b, and the liquid crystal layer between the upper substrate 301a and the lower substrate 301b.

The lower substrate 301b in the display apparatus according to the second embodiment of the present invention is identical in structure and manufacturing method to that of the display apparatus according to the first embodiment of the present invention.

Unlike the upper substrate 301a of the display apparatus according to the first embodiment of the present invention, the upper substrate of the display apparatus according to the second embodiment of the present invention is characterized in that column spacers 301h are formed in the first non-display area 301d. In the display apparatus according to the second embodiment of the present invention, a transmitting hole 301g is formed in a black matrix 301k of the first non-display area, and the column spacers 301h are formed at both sides of the transmitting hole 301g with respect to the transmitting hole 301g.

For this, after the black matrix, color filter and common electrode are sequentially deposited on the upper substrate 301a, the transmitting hole 301g is formed in the black matrix of the first non-display area by the above process. Then, the column spacers 301h are formed in the periphery of the transmitting hole 301g.

Thereafter, the edge of the display area is sealed by a first seal 301e, and then the liquid crystal is injected into the inside of the panel 301 via an inlet under the circumstance that the edge of the display area is sealed. Then, the panel 301 is completed by sealing the inlet.

As shown in FIG. 4, the first seal 301e is formed along the interface between the first non-display area and the display area. In case of the display apparatus according to the first embodiment of the present invention, the liquid crystal is filled in the first non-display area under the circumstance that the seal is not formed between the first non-display area and the display area. In case of the display apparatus according to the second embodiment of the present invention, while the first seal is formed between the first non-display area and the display area, the liquid crystal is injected only into the display area sealed by the first seal.

Also, the edge of the first non-display area is sealed by a second seal 301f, and a cell gap is maintained between the lower substrate 301b and the upper substrate 301a by the use of second seal.

For the manufacturing process of the upper substrate, at least one column spacer is formed in the periphery of the transmitting hole of the first non-display area, whereby the column spacer is formed in the first non-display area sealed by the first and second seals, as shown in FIG. 3.

The column spacer 301h is manufactured by the manufacturing process of the upper substrate. Since various patterns of the lower substrate 301b of the display area are not provided in the first non-display area 301d, there is a constant interval between the column spacer 301h and the lower substrate 301b.

The column spacer formed in the display area is deposited in such a manner that a height of the column spacer in the display area is determined in consideration to the height of pattern layers. Also, the column spacer 301h of the first non-display area 301d together with the column spacer of the display area is formed on the upper substrate 301a. Thus, in case of the column spacer 301h provided in the first non-display area on which the pattern for forming the pixel of the lower substrate is not formed, it is formed as a shape being provided at a predetermined interval from the lower substrate. However, the column spacer 301h in the first non-display area may be manufactured separately from the column spacer in the display area. In this case, a height of the column spacer 301h in the first non-display area 301d may be determined in consideration to a height of the cell gap between the lower substrate and the upper substrate, whereby the column spacer 301h in the first non-display area 301d may contact with the lower substrate.

As mentioned above, the various patterns for forming the pixel are not formed in the first non-display area. This is for improving the efficiency of antenna received in an antenna receiving part of the first panel supporter for supporting the first non-display area.

That is, the first panel supporter of the display apparatus according to the present invention may include not only the camera receiving part but also the antenna receiving part at both lateral sides of the camera receiving part. Thus, if receiving the antenna, the various patterns of the metal material for forming the pixel may deteriorate the efficiency of the antenna. In this respect, the various patterns of the display area are not provided in the lower substrate of the first non-display area.

If the patterns of the display area are provided in the lower substrate, an additional transmitting hole for transmitting light to the camera has to be formed in the patterns of the lower substrate. Thus, the patterns for forming the lower substrate are not provided in the first non-display area of the display apparatus according to the present invention. If the patterns of the lower substrate are provided in the first non-display area for the manufacturing process of the lower substrate, the patterns may be removed from the first non-display area by the etching process.

The column spacer in the non-display area is provided at a predetermined gap from the lower substrate. Virtually, the gap between the column spacer and the lower substrate is about 0.77 μm which is negligible.

Even though the panel of the transmitting hole of the first non-display area is pushed by the external force, the column spacer enables to prevent the depression in the black matrix, thereby preventing the depression in the upper substrate.

Moreover, since recess is prevented, the gap between the upper substrate 301a and the lower substrate 301b is not changed. Therefore, a refractive index between the upper substrate 301a and the lower substrate 301b is not changed. Accordingly, diffraction can be prevented from occurring around the transmitting hole, and thus, a diffraction pattern can be prevented from being formed on an image that is captured by the camera.

Figure 5:
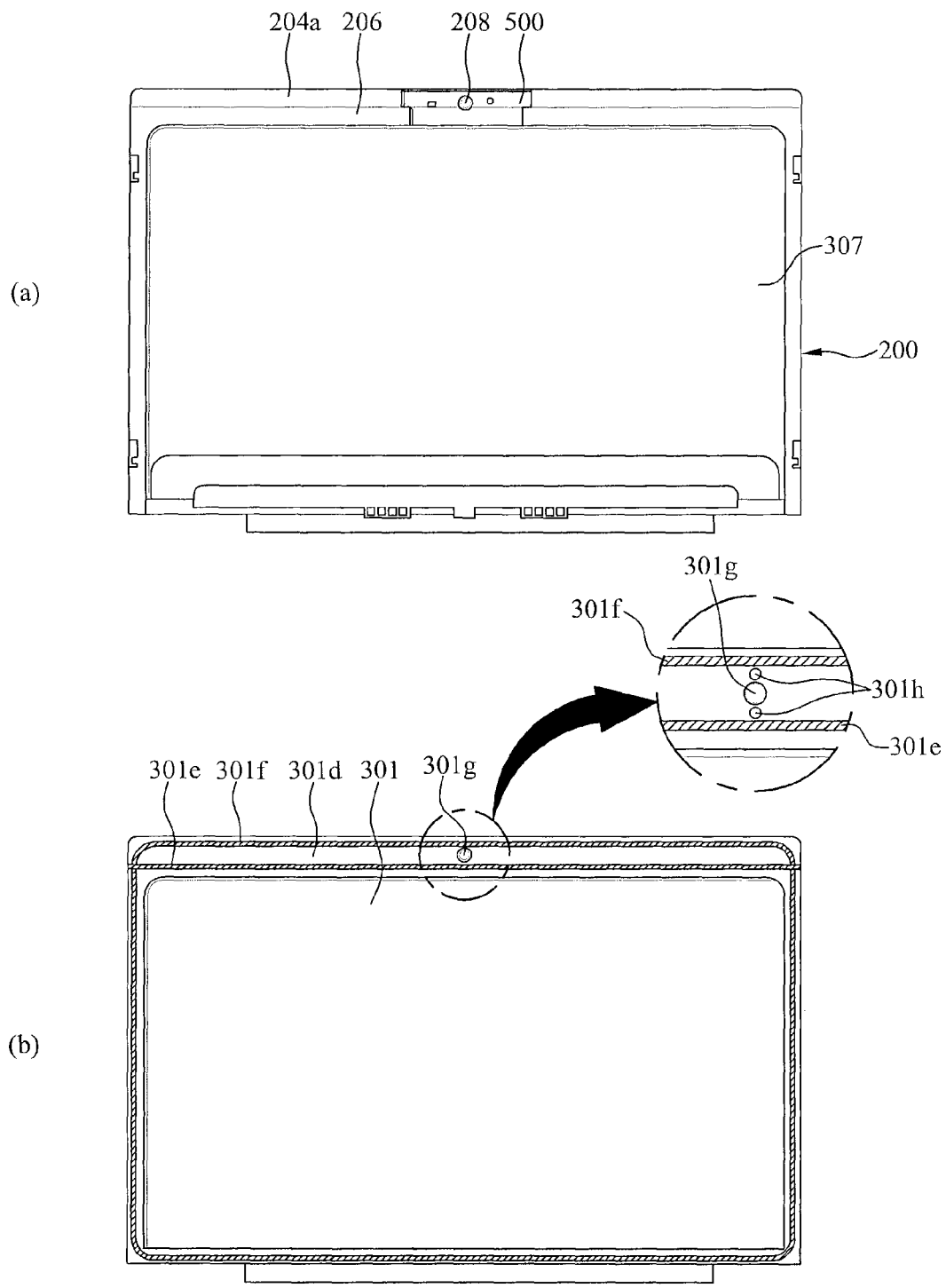
FIG. 5 is a plane view illustrating a lower side of a display apparatus according to the present invention.

FIG. 5 is a plane view illustrating the lower side of a display apparatus according to the present invention, wherein (a) of FIG. 5 illustrates a virtually-shown lower side of the display apparatus according to the first embodiment and second embodiment, and (b) of FIG. 5 illustrates a perspective view of the panel placed on the panel supporter and the lower supporter, particularly, the first seal 301e and the second seal 301f formed inside the panel of the display apparatus according to the second embodiment of the present invention.

As shown in (a) of FIG. 5, the peripheral region of the lower side of the display apparatus according to the first embodiment and the second embodiment is covered with the guide frame 200.

Meanwhile, as mentioned above, the guide frame 200 is formed vertically while being in parallel to the set sidewall 102 of the set cover 100, wherein the guide frame 200 is formed in the square-shaped frame. The guide frame 200 includes the guide sidewall 202 which covers the lateral side of the display unit 300. However, since the guide sidewall 202 protrudes in the opposite direction to the viewing side from (a) of FIG. 5, the guide sidewall 202 is not shown in (a) of FIG. 5.

The panel supporter 204, which protrudes from the guide sidewall in the opposite direction to the set cover, supports the panel. Especially, the camera hole 208 is formed in the first panel supporter 204a with the camera receiving part 500 to be provided with the camera.

That is, the camera receiving part 500 for receiving the camera therein is formed in the central portion of the first panel supporter 204a. Also, the camera hole 208 is formed in the first panel supporter with the camera receiving part. Thus, the ambient light comes to the camera via the first peripheral portion of the polarizing film, the panel, and the camera hole 208.

The lower supporter 206 is formed with the stepped portion from the panel supporter, and the lower supporter 206 supports the light-guiding plate, the light source, the reflective plate, and the optical film arranged at the lower side of the panel. At this time, since the reflective plate 307 is positioned at the lowest portion as shown in FIG. 2, the reflective plate 307 is placed onto the lower supporter 206, as shown in (a) of FIG. 5.

For the above explanation about the display apparatus according to the present invention, the display apparatus according to the present invention is a liquid crystal display apparatus having the display unit including the light-guiding plate and the light source, but it is not limited to this type. Instead, the display unit may be formed of plasma display panel, a field emission display apparatus, and a light-emitting display apparatus.

Also, (b) of FIG. 5 illustrates the lower side of the display apparatus according to the second embodiment of the present invention. As mentioned above, (b) of FIG. 5 illustrates the perspective view of the panel placed on the panel supporter 204 and the lower supporter 206. Thus, (b) of FIG. 5 illustrates the transmitting hole 301g, first seal 301e, and second seal 301f in the first non-display area inside the panel applied to the second embodiment of the present invention.

That is, the second seal is formed in the outermost portion of the panel, whereby the second seal is formed in the outermost portion of the entire panel. Also, the first seal is formed along the interface between the display area and the first non-display area 301d of the panel.

Figure 6:
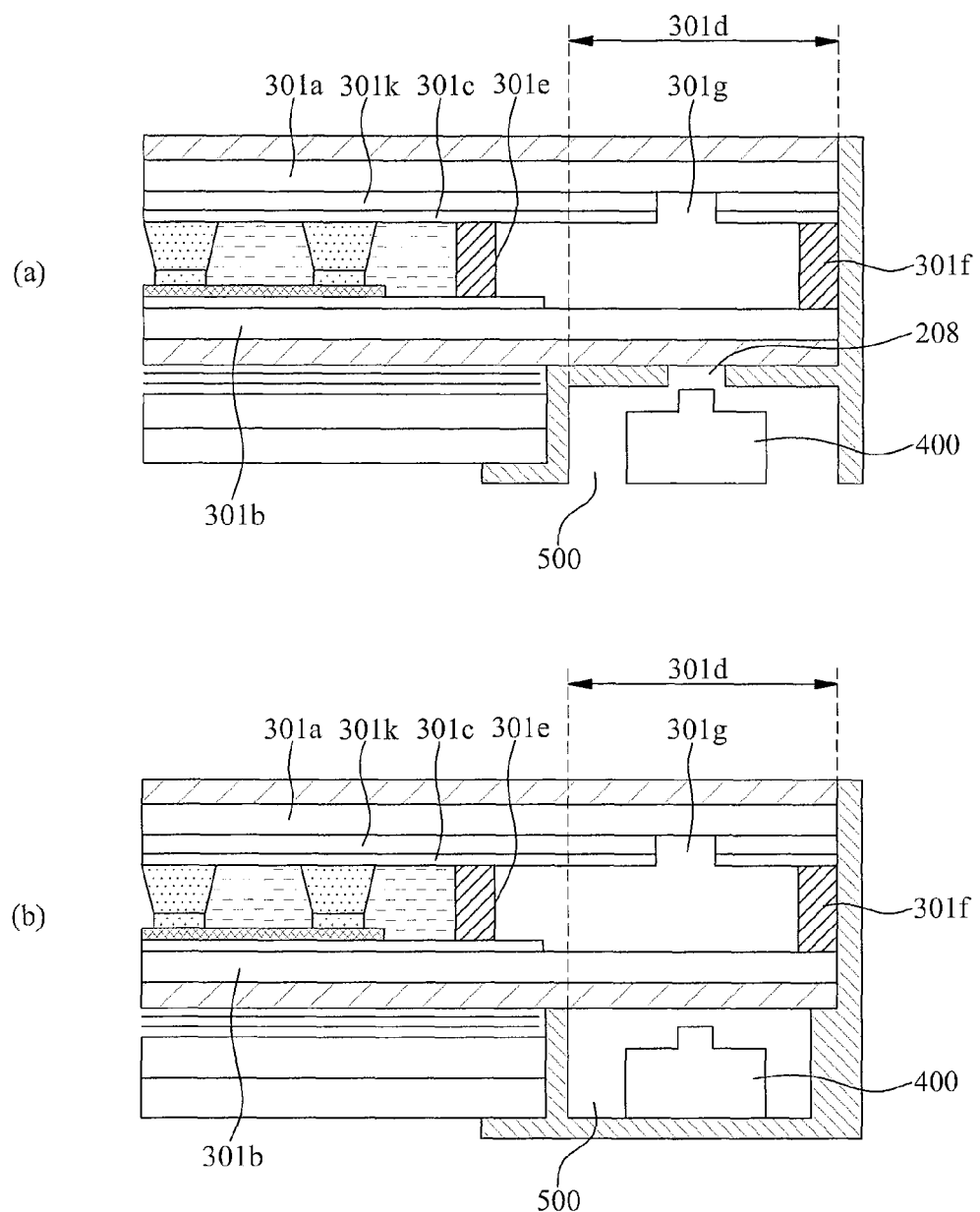
FIG. 6 is a detailed cross section view illustrating a display apparatus according to the third embodiment of the present invention.

FIG. 6 is a detailed cross section view illustrating a display apparatus according to the third embodiment of the present invention, which illustrates the detail of portion 'D' of FIG. 2.

Except that the first seal 301e is formed to separate the display area and the first non-display area of the panel from each other, and the first non-display area is not filled with liquid crystal, the display apparatus according to the third embodiment of the present invention is identical in structure to the display apparatus according to the first embodiment of the present invention. Also, except that the column spacer is not formed in the first non-display area, the display apparatus according to the third embodiment of the present invention is identical in structure to the display apparatus according to the second embodiment of the present invention. Thus, a detailed explanation for the same parts as those of the first or second embodiment will be omitted. Also, even though the guide panel shown in (a) of FIG. 6 is different in structure from the guide panel shown in (b) of FIG. 6, their functions are the same.

First, in comparison to the first embodiment of the present invention, (a) of FIG. 6 shows that the first non-display area 301d and the display area are sealed by the first seal 301e, and the liquid crystal is not filled in the first non-display area 301d sealed by the first seal 301e and the second seal 301f.

In comparison to the second embodiment of the present invention, (a) of FIG. 6 shows that the column spacer is not formed in the first non-display area.

Except that the structure of the first panel supporter with the camera receiving part, (b) of FIG. 6 is identical in structure and function to (a) of FIG. 6.

As mentioned in the above explanation for the first embodiment of the present invention with reference to FIG. 2, the first panel supporter 204a may be formed in the '∩' shape or '∪' shape. In this case, (a) of FIG. 6 illustrates the '∩'-shaped first panel supporter, and (b) of FIG. 6 illustrates the '∪'-shaped first panel supporter.

The third embodiment of the present invention enables to prevent a ripple phenomenon from occurring in the panel by the contact with the first panel supporter.

The third embodiment shown in (a) and (b) of FIG. 6 enables to prevent a ripple phenomenon from occurring by the interference with the guide frame arranged in the lower side of the panel.

In addition, among the black matrixes deposited on the upper substrate, the non-display area including the periphery of the transmitting hole in the area corresponding to the camera is isolated by the first seal 301e, and the liquid crystal is not filled in the non-display area 301d, whereby it is possible to prevent a ripple phenomenon from occurring in the panel by the first panel supporter, wherein the first panel supporter supports the panel while being positioned at the lower side of the panel.

If the first panel supporter is formed in the V shape, as shown in (b) of FIG. 6, the above function may be maximized. That is, in (b) of FIG. 6, the first panel supporter 204a is formed in the '∪' shape, and thus, the first non-display area including the periphery of the transmitting hole is not attached to the first panel supporter 204a. Therefore, interference between the first non-display area and the first panel supporter 204a does not occur. Accordingly, a ripple is not generated.

Hereinafter, a display apparatus according to the fourth embodiment of the present invention will be described with reference to FIGS. 7 to 16.

Figure 7:
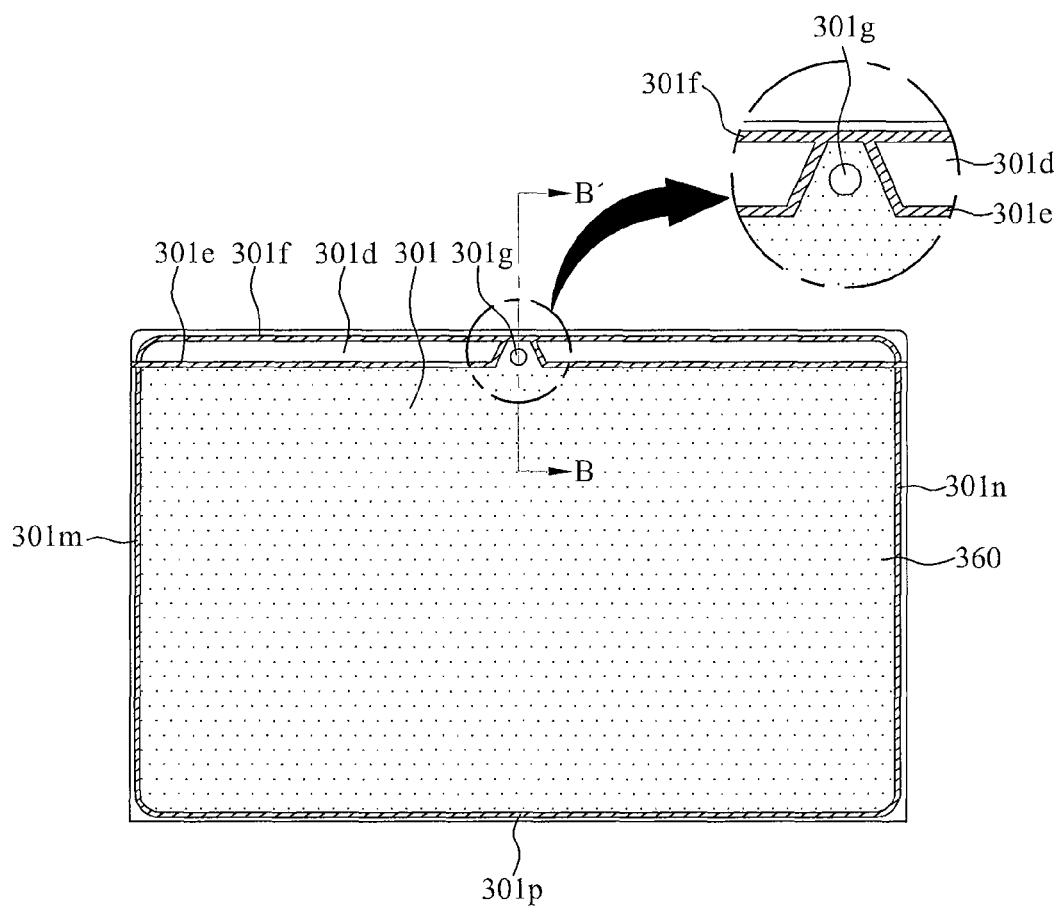
FIG. 7 is a plane view illustrating a panel applied to a display apparatus according to the present invention.
Figure 8:
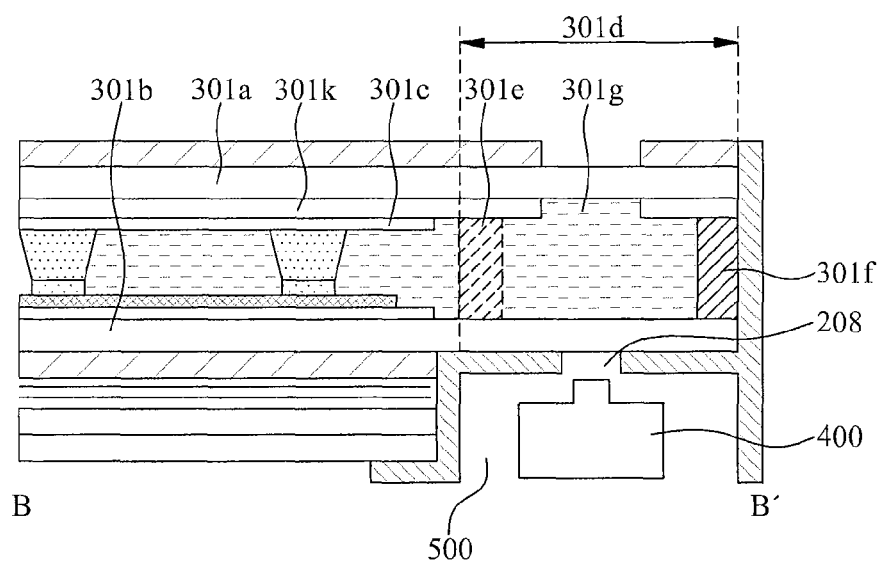
FIG. 8 is a detailed cross section view illustrating a display apparatus according to the present invention.

FIG. 7 is a plane view illustrating a panel applied to a display apparatus according to the fourth embodiment of the present invention, which illustrates the plane of the panel 301 of the display apparatus shown in FIG. 2. FIG. 8 is a detailed cross section view illustrating a display apparatus according to the fourth embodiment of the present invention, which illustrates the detail of portion 'D' of FIG. 2. Especially, the cross section of the panel 301 shown in FIG. 8 is to the cross section along B-B' of FIG. 7.

The panel applied to the display apparatus according to the fourth embodiment of the present invention includes the upper substrate 301a and the lower substrate 301b which are bonded to each other under the circumstance that the liquid crystal layer is formed therebetween. The liquid crystal layer between the lower substrate 301b and the upper substrate 301a is sealed by the seal formed in the peripheral region of the panel.

The panel applied to the present invention may be divided into the display area 360 in which the various elements are formed to display the image; and the non-display area which is formed in the periphery of the display area. At this time, the second to fifth seals 301f, 301m, 301n, 301p are respectively formed at the peripheral regions of the panel in the non-display area of the panel, thereby sealing the gap between the upper substrate and the lower substrate. Also, the first seal 301e is formed between the first non-display area 301d and the display area 360.

That is, the second to fifth seals 301f, 301m, 301n, 301p are formed in the outermost portions of the four sides of the panel, that is, the outermost portions of the entire panel. The first seal 301e is formed in the boundary between the first non-display area 301d of the panel and the display area 360.

Also, in order to make the ambient light guide toward the camera lens, the transmitting hole 301g made by removing the black matrix 301k is formed in the first non-display area 301d.

As shown in the expanded circle portion of FIG. 7, the first seal 301e is formed in the shape surrounding the peripheral region of the transmitting hole (hereinafter, referred to as 'transmitting part'). In FIG. 7, since the first seal and second seal surrounding the transmitting part are connected with each other, the transmitting part is isolated from the remaining portions of the first non-display area except the transmitting part (which will be referred to as 'vacuum part'), and is provided to penetrate the display area.

When the liquid crystal (liquid crystal layer) is filled between the lower substrate and the upper substrate sealed by the first seal 301e and the third to fifth seals 301m, 301n, 301p, the liquid crystal is filled in the transmitting part. At this time, the vacuum part is sealed by the first seal and the second seal under the vacuum state.

Meanwhile, the above structure can be shown in FIG. 8 which illustrates the cross section of the display apparatus according to the fourth embodiment of the present invention. The cross section shown in FIG. 8 illustrates the display apparatus according to the present invention on which the panel including the cross section along B-B' of FIG. 7 is mounted, especially, the cross section of portion 'D' of FIG. 2.

That is, as shown in FIGS. 7 and 8, the panel applied to the present invention includes the upper substrate 301a, the lower substrate 301b, and the liquid crystal layer formed between the upper substrate 301a and the lower substrate 301b.

The upper substrate 301a, lower substrate 301b, and liquid crystal layer is the same as those of the above, whereby a detailed explanation for the upper substrate 301a, lower substrate 301b, and liquid crystal layer will be omitted.

In FIGS. 7 and 8, the second seal 301f indicates the seal formed in the outermost portion of the first non-display area 301d of the panel; and the first seal 301e indicates the seal formed along the interface between the display area 360 of the panel and the first non-display area 301d.

As shown in FIG. 7, the first seal 301e is extended from the third seal 301m and the fourth seal 301n while being in parallel to the second seal 301f; curved toward the second seal to surround the transmitting part, and then connected with the second seal. Meanwhile, since FIG. 8 illustrates the cross section surface along B-B' of FIG. 7, the first seal 301e is expressed by a dotted line.

As mentioned above, since the transmitting part is sealed by the first seal and the portions of the second seal, the liquid crystal is filled therein, and the vacuum part of the first non-display area except the transmitting part is sealed under the vacuum state by the use of first seal and second seal.

The reason why the transmitting part is filled with the liquid crystal is to compensate for a concentric-circle shaped diffraction pattern in accordance with diffraction of light passing through the transmitting hole 301g by using a scattering property of liquid crystal.

That is, the concentric-circle shaped diffraction pattern on the image taken by the camera, and the spectrum mura shown on the external of the panel may occur due to the diffraction of light passing through the transmitting hole. These problems are solved through the use of scattering property of liquid crystal by filling the liquid crystal in the transmitting part between the transmitting hole and the camera lens.

Especially, since a refractive index (n=1.54) of the liquid crystal is similar to a refractive index (n=1.51) of glass for forming the lower substrate and the upper substrate, the diffraction may be decreased more, thereby resulting in the decreased diffraction pattern on the image and the decreased spectrum mura on the front of the panel.

In addition to the various shapes shown in FIGS. 7 and 8, the various shapes of first seal surrounding the transmitting part may be provided.

FIGS. 9 to 13 illustrate various shapes of first seal formed in the panel of the display apparatus according to the fourth embodiment of the present invention, which illustrate various examples of the seal pattern in the periphery of the transmitting part, and correspond to the expanded circle shape of FIG. 3.

Figure 9:
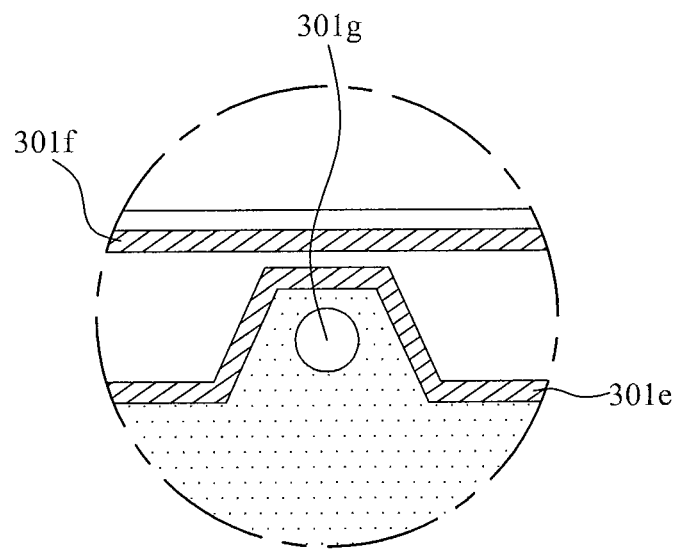
FIGS. 9 to 13 illustrate various shapes of first seal formed in a panel of a display apparatus according to the present invention.

First, the first seal 301e shown in FIG. 9 is extended from the third seal and the fourth seal while being in parallel to the second seal, wherein the first seal 301e is formed in the shape surrounding the transmitting part.

That is, the transmitting part shown in FIG. 7 is surrounded by the first seal and the portions of the second seal. Meanwhile, the transmitting part shown in FIG. 9 is surrounded only by the first seal 301e.

Figure 10:
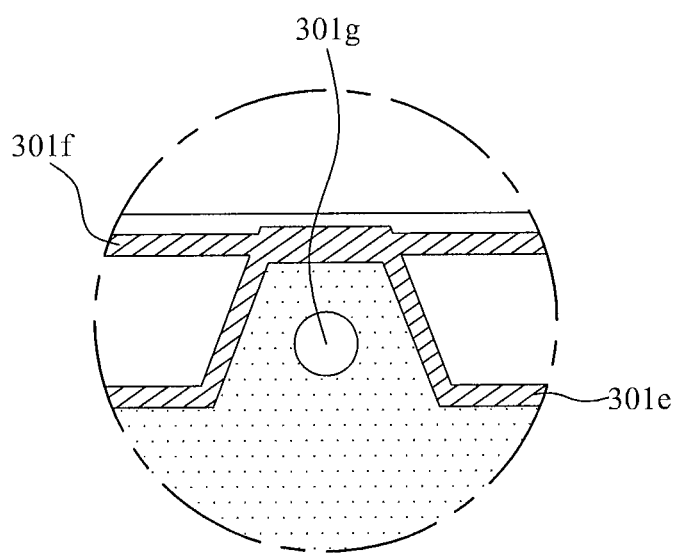

Then, the first seal shown in FIG. 10 extends from the third seal and the fourth seal while being in parallel to the second seal, and then surrounds the transmitting part. In this case, the first seal 301e being positioned adjacent to the second seal 301f is overlapped with the second seal 301f.

That is, in case of the transmitting part shown in FIG. 7, one side of the transmitting part is surrounded only by the second seal. In case of the transmitting part shown in FIG. 10, the transmitting part is surrounded by the first seal, wherein the predetermined portion of the first seal 301e being adjacent to the second seal 301f overlaps with the second seal 301f.

Figure 11:
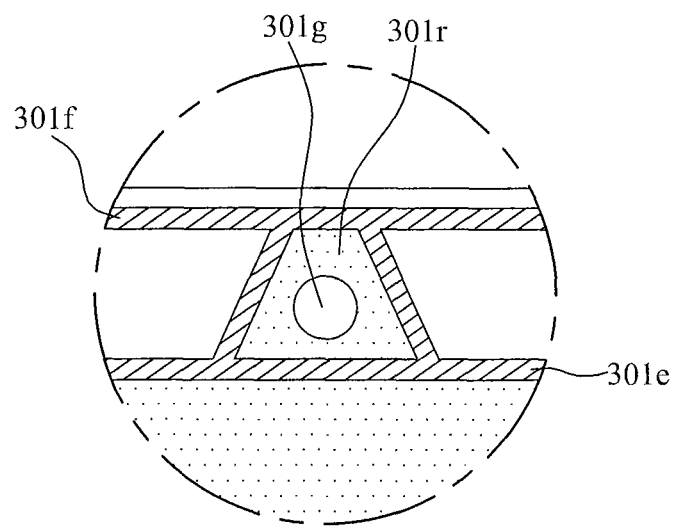

Then, the first seal shown in FIG. 11 is identical in structure to the first seal shown in FIG. 7. Additionally, the first seal is formed between the transmitting part and the display area.

That is, the transmitting part shown in FIG. 11 is isolated from the display area and the vacuum part by the first seal 301e and the predetermined portion of the second seal 301f.

Figure 12:
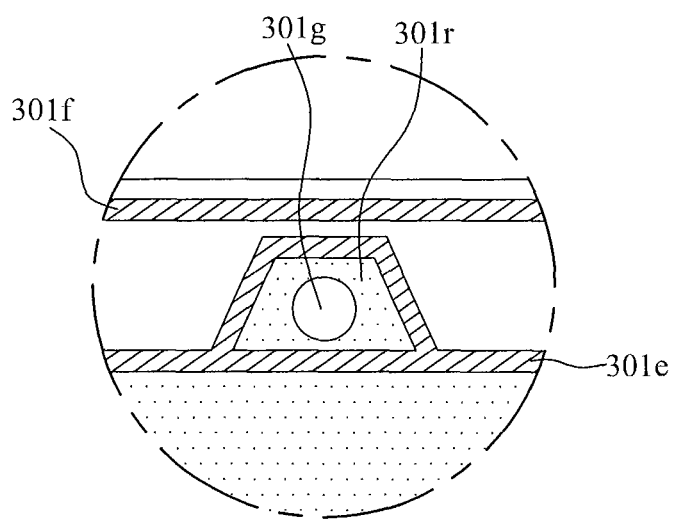

Then, the first seal shown in FIG. 12 is identical in structure to the first seal shown in FIG. 9. Additionally, the first seal is formed between the transmitting part and the display area.

That is, the transmitting part shown in FIG. 12 is isolated from the display area and the vacuum part by the first seal.

Figure 13:
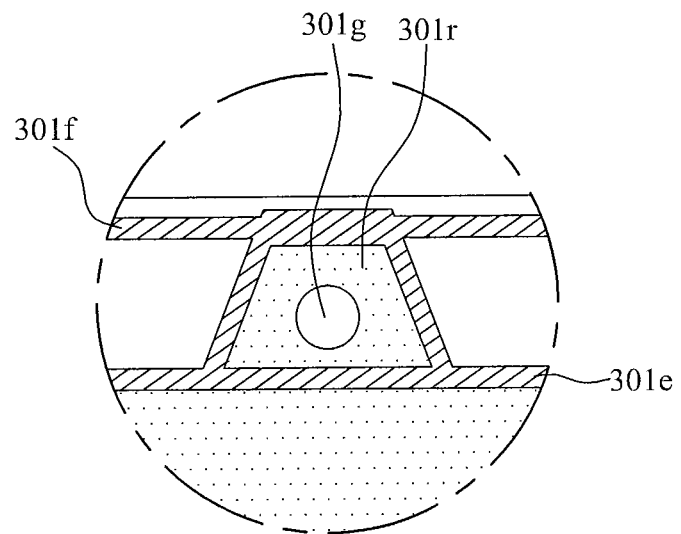

Then, the first seal shown in FIG. 13 is identical in structure to the first seal shown in FIG. 10. Additionally, the first seal is formed between the transmitting part and the display area.

That is, the transmitting part shown in FIG. 13 is isolated from the display area and the vacuum part by the first seal 301e, and the overlapped portion between the first seal 301e and the second seal 301f.

Among the above structures, the transmitting part penetrates the display area by the first seal shown in FIGS. 7 to 10. Thus, in case of the panel shown in FIGS. 7 to 10, the transmitting part may be filled only with the liquid crystal.

However, the transmitting part is isolated from the display area and the vacuum part while being sealed by the first seal shown in FIGS. 11 to 13. Thus, in case of the panel shown in FIGS. 11 to 13, the transmitting part may be filled with the other filling materials in addition to the liquid crystal.

First, the transmitting part of the panel shown in FIGS. 11 to 13 may be filled with the filling material of the liquid crystal. In the same manner as the liquid crystal injection method, an inlet is formed in the first seal surrounding the transmitting part, and then liquid crystal is injected via the inlet and the inlet is sealed.

In this case, it is possible to prevent the foreign matters from being collected in the transmitting part. That is, if the liquid crystal is injected into the panel shown in FIGS. 7 to 10, the foreign matters remaining between the lower substrate and the upper substrate may be collected in the transmitting part, thereby deteriorating the light transmittance. In case of the panel shown in FIGS. 11 to 13, the transmitting part is separately sealed so that this problem does not occur.

Then, the transmitting part of the panel shown in FIGS. 11 to 13 may be filled with liquid or gas whose refractive index is similar to that of glass for forming the upper substrate and the lower substrate.

The refractive index of glass is about 1.51. As shown in the following Table 1, the transmitting part may be filled with various liquid or gas materials (the following material) 301r whose refractive index is similar to 1.51.

TABLE 1

| Material | Refractive index |
| --- | --- |
| Ethyl Salicylate | 1.52 |
| Styrene | 1.52 |
| Methyl Salicylate | 1.53 |
| Sugared Water (80%) | 1.49 |

Meanwhile, if the filling material 301r is the liquid or gas material, in the same manner as the liquid crystal injection method, an inlet is formed in the first seal for forming the transmitting part, and then liquid or gas filling material is injected via the inlet and the inlet is sealed.

If the filing material is a solid material, the filling material manufactured in the same shape as that of the transmitting part may be positioned in the transmitting part. Unlike the liquid crystal layer, it is unnecessary to completely seal the transmitting part by the first seal. That is, after injecting the solid filling material by forming an inlet in the first seal for forming the transmitting part, the first seal of the transmitting part may be sealed.

That is, as mentioned above, the method for injecting the liquid, solid, or gas filling material into the transmitting part sealed by the first seal is to minimize the refraction of light passing through the inlet by the use of filling material whose refractive index is very similar to that of glass, thereby resulting in the minimized light diffraction. Thus, it is possible to improve visibility by decreasing the spectrum mura on the panel surface, and to remove the concentric-circle shaped diffraction pattern from the image taken by the camera.

Preferably, the refractive index of the above filling material 301r is about 1.3 to about 1.7 in consideration to the diffraction property.

Figure 14:
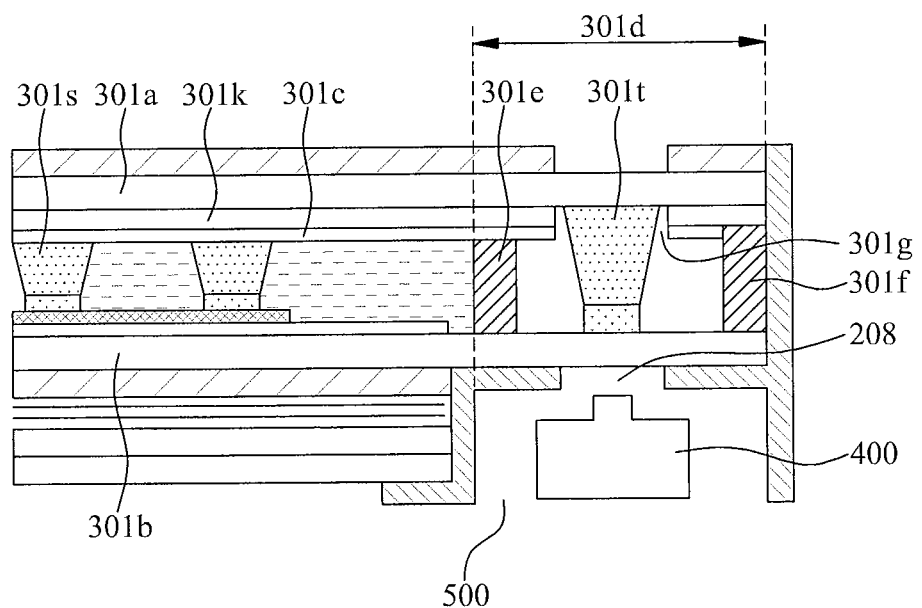
FIG. 14 is another detailed cross section view illustrating a display apparatus according to the present invention.
Figure 15:
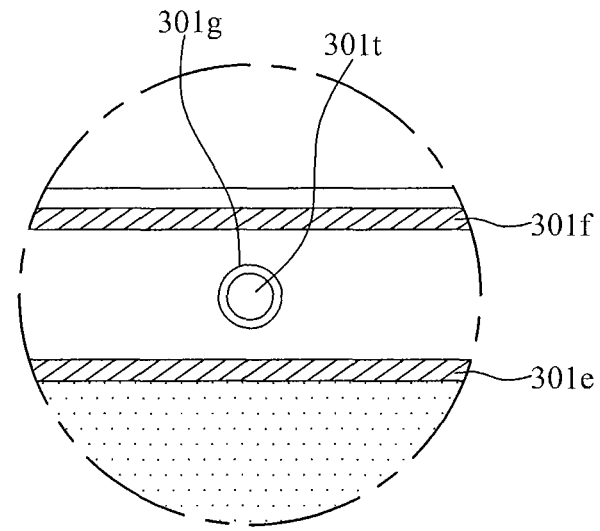
FIG. 15 is another plane view illustrating a panel applied to a display apparatus according to the present invention.

FIG. 14 is another detailed cross section view illustrating a display apparatus according to the fourth embodiment of the present invention, which illustrates the detail of portion 'D' of FIG. 2. FIG. 15 is another plane view illustrating a panel applied to a display apparatus according to the fourth embodiment of the present invention. The first non-display area of FIG. 14 is exemplary shown in FIGS. 9 to 13.

As shown in FIG. 14, another shape of the display apparatus according to the present invention includes the first seal 301e which is provided for the division between the display area 360 of the panel and the first non-display area 301d. If the first non-display area is not filled with the liquid crystal (vacuum state), a transmitting-hole column spacer 301t whose structure is the same as that of a column spacer 301s in the display area is formed in the transmitting hole 301g made by removing the black matrix 301k.

Herein, the transmitting-hole column spacer 301t may be formed of the solid filling material that has been described above with reference to FIGS. 11 to 13. That is, the transmitting-hole column spacer 301t is formed of a material having a refractive index similar to that of the glass, and thus removes a spectrum-shaped concentric circle by decreasing the diffraction of light passing through the transmitting hole.

The transmitting-hole column spacer may be manufactured together with the column spacer 301r formed in the display area. In this case, as a height of the transmitting-hole column spacer 301t becomes higher than a height of the column spacer in the display area by the use of halftone mask, the transmitting-hole column spacer may contact with the upper substrate and the lower substrate. However, since there is the small gap between the upper substrate and the lower substrate, it is allowed that the transmitting-hole column spacer is formed at the same height as that of the column spacer in the display area by the same process.

As shown in FIG. 15, under the circumstance that the peripheral region of the transmitting hole is not surrounded by the first seal, the transmitting-hole column spacer is formed in the transmitting part. As shown in FIGS. 7 to 11, the transmitting-hole column spacer formed in the transmitting part may vary in shape.

That is, as shown in FIGS. 7 to 10, the transmitting-hole column spacer 301t may be surrounded by the first seal under the circumstance that the transmitting part penetrates through the display area. As shown in FIGS. 11 to 13, the transmitting-hole column spacer may be isolated from the display area and the vacuum part while being sealed.

Thus, if the transmitting-hole column spacer is formed in the transmitting part as shown in FIGS. 7 to 10, the transmitting part is filled with the liquid crystal.

Figure 16:
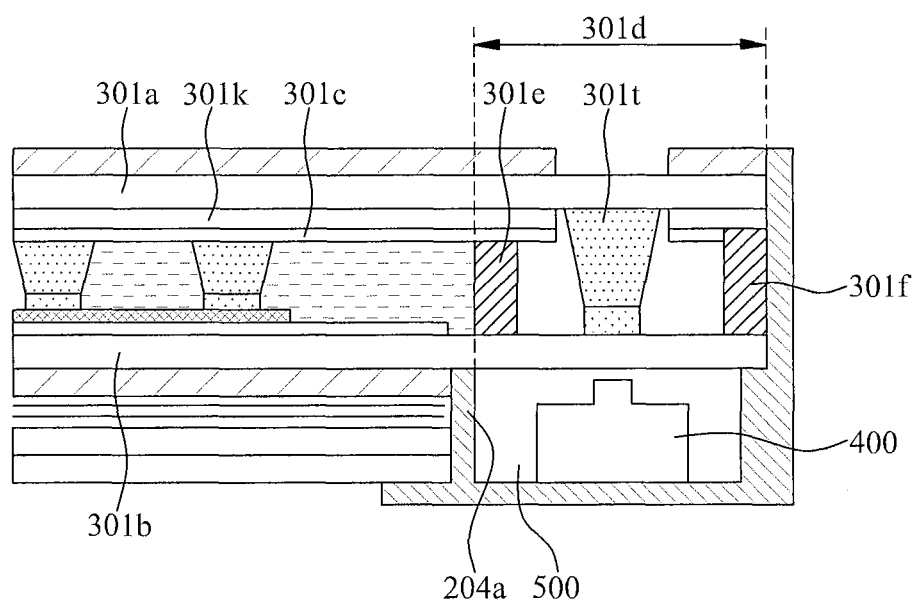
FIG. 16 is another detailed cross section view illustrating a display apparatus according to the present invention.

FIG. 16 is another detailed cross section view illustrating a display apparatus according to the fourth embodiment of the present invention. Except the structure of first panel supporter 204a, the display apparatus shown in FIG. 16 is identical in structure to the display apparatus shown in FIGS. 7 to 15, whereby a detailed explanation for the same part will be omitted.

Except the structure of the first panel supporter 204a having the camera receiving part, the display apparatus shown in FIG. 16 is identical in structure and function to the display apparatus shown in FIGS. 7 to 14.

That is, as mentioned in the above explanation with reference to FIG. 2, the first panel supporter 204a may be formed in the '∩' shape or 'U' shape. FIG. 16 illustrates the 'U'-shaped first panel supporter.

Thus, except the first panel supporter, the display apparatus shown in FIG. 16 is identical in structure to the display apparatus shown in FIGS. 7 to 15, wherein the transmitting part may vary in shape, as mentioned above.

That is, in case of the display apparatus according to the fourth embodiment of the present invention, the transmitting part inside the panel 301 is filled with the various kinds of filling material, to thereby decrease the diffraction pattern on the image taken by the camera, and the spectrum mura shown on the plane of the panel. The structure of the transmitting part may be manufactured in various shapes, as mentioned above.

In addition, since the transmitting hole generates the concentric-circle shaped diffraction pattern by the diffraction of light, the spectra mura to be shown by the naked eyes occurs in the periphery of the transmitting hole, and the concentric-circle shaped diffraction pattern is shown on the image taken by the camera. In case of the display apparatus according to the fourth embodiment of the present invention, the transmitting part in the periphery of the transmitting hole is sealed by the use of seal, and is then filled with the various kinds of the filling material, thereby preventing the above diffraction phenomenon. Thus, it is possible to remove the spectra mura shown by the naked eyes, and to remove the diffraction pattern from the image taken by the camera.

For this, the display apparatus according to the fourth embodiment of the present invention uses the following two methods.

The first method is to scatter the light passing through the transmitting hole and advancing toward the camera lens by filling the transmitting part with the filling material having the scattering property, for example, the liquid crystal.

The second method is to decrease the refraction and diffraction of the light passing through the transmitting hole and advancing toward the camera by filling the transmitting part with the solid, liquid, or gas filling material whose refractive index is similar to that of the glass for forming the panel. In case of the solid material, it is possible to apply the transmitting-hole column spacer whose shape is the same as that of the column spacer for maintaining the cell gap between the upper substrate and the lower substrate. The liquid glass material may be injected into the transmitting part, and be coagulated therein. Also, the solid glass material may be attached to the transmitting part.

For filling the transmitting part with the various kinds of filling material in the display apparatus according to the fourth embodiment of the present invention, the peripheral region of the transmitting part may be sealed in various shapes by the use of seal.

In the display apparatus according to the fourth embodiment of the present invention, the depression is not generated in the periphery of the transmitting part since the peripheral region of the transmitting hole is surrounded by the seal, or filled with the filling material, thereby preventing the mura defect from the predetermined portion of the display area being adjacent to the transmitting hole.

Accordingly, the liquid crystal is injected into the non-display area having the transmitting hole formed in the predetermined portion of the panel corresponding to the camera, or the column spacer is formed in the non-display area having the transmitting hole formed in the predetermined portion of the panel corresponding to the camera so as to prevent the depression of the upper substrate, thereby preventing the depression of the upper substrate in the periphery of the transmitting hole, and preventing the mura from the display area.

Also, the transmitting part having the transmitting hole formed in the non-display area of the panel corresponding to the camera is sealed by the use of seal, and then the inside is filled with any one filling material of solid, liquid, and gas. Thus, the inner refractive index of the transmitting part having the transmitting hole is similar to the refractive index of the substrate so that it is possible to prevent the diffraction in the periphery of the transmitting hole, and to prevent the diffraction pattern from the image taken by the camera.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A display apparatus comprising:
a display unit having a panel which is provided with lower and upper substrates sealed having liquid crystal filled therebetween; and
a guide frame, which supports the display unit,
wherein the guide frame includes:
a guide sidewall, which guides a lateral side of the panel; and
a panel supporter, which supports the panel, wherein a camera receiving part with a camera mounted thereon is disposed in a first panel supporter of the panel supporter, a transmitting hole for transmitting light to the camera is disposed in a black matrix of a first non-display area to be placed on the first panel supporter of the upper substrate, and a display area of the panel and the first non-display area inclusive of an area between the camera and the transmitting hole are filled with liquid crystal.

2. The display apparatus according to claim 1, wherein a common electrode is disposed in the black matrix, and the transmitting hole is formed by etching the black matrix and the common electrode together.

3. The display apparatus according to claim 1, wherein a seal for sealing the upper substrate and the lower substrate is disposed in the periphery of the first non-display area.

4. The display apparatus according to claim 1, wherein a camera hole corresponding to the transmitting hole is disposed in the first panel supporter.

5. A display apparatus comprising:
a display unit having a panel which is provided with lower and upper substrates sealed with liquid crystal filled therebetween; and a guide frame, which supports the display unit, wherein the guide frame includes: a guide sidewall, which guides a lateral side of the panel; and a panel supporter, which supports the panel, wherein a camera receiving part with a camera mounted thereon is disposed in a first panel supporter of the panel supporter, a transmitting hole for transmitting light to the camera is disposed in a black matrix of a first non-display area to be placed on the first panel supporter of the upper substrate, a first seal is disposed between a display area of the panel and the first non-display area; the display area of the panel and the first non-display area inclusive of an area between the camera and the transmitting hole are filled with liquid crystal.

6. The display apparatus according to claim 5, wherein a second seal is disposed in the periphery of the first non-display area.

7. The display apparatus according to claim 5, wherein the first panel supporter is formed in the shape of '∪'.

8. The display apparatus according to claim 5, wherein the first panel supporter is formed in the shape of '∩', and a camera hole corresponding to the transmitting hole is disposed in the first panel supporter.

9. The display apparatus according to claim 5, wherein at least one column spacer is disposed in the periphery of the transmitting hole in the first non-display area.

10. The display apparatus according to claim 9, wherein the column spacer in the periphery of the transmitting hole is formed by the same process as those of column spacers in the display area of the upper substrate.

11. A display apparatus comprising:
a display unit having a panel which is provided with lower and upper substrates sealed with liquid crystal filled therebetween; and
a guide frame, which supports the display unit,
wherein a transmitting hole for transmitting light to a camera provided below the panel is disposed in a black matrix of a first non-display area of the upper substrate, and
the first non-display area is divided into a transmitting part for the transmitting hole formed therein, and a vacuum part corresponding to the remaining parts except the transmitting part, wherein the transmitting part is sealed by a first seal formed along the interface between a display area of the panel and the first non-display area while being isolated from the vacuum part, and the transmitting part is filled with a filling material.

12. The display apparatus according to claim 11, wherein the first seal is curved toward a second seal direction for sealing the periphery of the non-display area to surround the transmitting part, and the transmitting part is filled with the liquid crystal injected into the display area.

13. The display apparatus according to claim 12, wherein the transmitting part is sealed by the first seal and some portions of the second seal, and is isolated from the vacuum part.

14. The display apparatus according to claim 12, wherein the transmitting part is sealed only by the first seal, and is isolated from the vacuum part.

15. The display apparatus according to claim 11, wherein the first seal is curved toward a second seal direction for sealing the periphery of the non-display area to surround the transmitting part, and is formed along the interface between the transmitting part and the display area.

16. The display apparatus according to claim 15, wherein the filling material is a solid, liquid, or gas material having a refractive index between about 1.3 to about 1.7.

17. The display apparatus according to claim 15, wherein the filling material is liquid crystal.

18. The display apparatus according to claim 15, wherein the filling material is a transmitting-hole column spacer, which is formed together with a column spacer, for maintaining a cell gap between the upper substrate and the lower substrate in the display area.

19. The display apparatus according to claim 11, wherein a common electrode is disposed in the black matrix, and the transmitting hole is formed by etching the black matrix together with the common electrode.

20. The display apparatus according to claim 11, wherein the guide frame includes:
a guide sidewall, which guides a lateral side of the panel; and
a panel supporter, which supports the panel.

21. A display apparatus comprising:
a display unit having a panel which is provided with lower and upper substrates sealed with liquid crystal filled therebetween; and a guide frame, which includes a guide sidewall and a panel supporter so as to support the display unit; wherein a transmitting hole for transmitting light to a camera provided below the panel is disposed in a black matrix of a first non-display area of the upper substrate, a first seal is disposed along the interface between a display area of the panel and the first non-display area, and a transmitting-hole column spacer is disposed in the transmitting hole, wherein the transmitting-hole column spacer is formed together with a column spacer for maintaining a cell gap between the upper substrate and the lower substrate; and the display area of the panel and the first non-display area inclusive of an area between the camera and the transmitting hole are filled nfth liquid crystal.

22. The display apparatus according to claim 21, wherein a second seal is disposed in the periphery of the first non-display area.

23. The display apparatus according to claim 21, wherein a camera receiving part with a camera mounted thereon is formed in a first panel supporter of the panel supporter, and the first non-display area is placed on the first panel supporter.

24. The display apparatus according to claim 23, wherein the first panel supporter is formed in the shape of 'U'.

25. The display apparatus according to claim 23, wherein the first panel supporter is formed in the shape of '∩', and a camera hole corresponding to the transmitting hole is disposed in the first panel supporter.

26. A display apparatus comprising:
an upper substrate, which is provided with a black matrix in a first non-display area; and a lower substrate, which includes a plurality of pixels in a display area, wherein the lower substrate is bonded to the upper substrate with a liquid crystal layer interposed therebetween,
wherein a transmitting hole for transmitting light to a camera provided below the lower substrate is disposed in the black matrix of the first non-display area, and
a first seal is disposed along the interface between the first non-display area and the display area, wherein the first seal is curved toward a second seal direction in the periphery of the first non-display area so as to isolate a transmitting part with the transmitting hole from a vacuum part corresponding to the remaining parts of the first non-display area except the transmitting part, and the transmitting part is filled with a filling material; wherein the display area the panel and the it t non-display area inclusive of an area between the camera and the transmitting hole are filled with liquid crystal.

27. The display apparatus according to claim 26, wherein the transmitting hole penetrates through the display area, and the transmitting part is filled with the liquid crystal injected into the display area.

28. The display apparatus according to claim 26, wherein the first seal is disposed along the interface between the transmitting part and the display area.

29. The display apparatus according to claim 28, wherein the filling material is a solid, liquid, or gas material having a refractive index between about 1.3 to about 1.7.

* * * * *